(12) United States Patent
Swann et al.

(10) Patent No.: US 6,302,481 B1
(45) Date of Patent: Oct. 16, 2001

(54) THRUST AND ROCK VEHICLE SEAT

(75) Inventors: Timothy A. Swann, Mesa; Jess A. Cuevas, Scottsdale; Ahmad K. Al-Amin, Higley; Bryan W. Shirk; Roy D. Van Wynsberghe, both of Mesa, all of AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/498,176

(22) Filed: Feb. 4, 2000

(51) Int. Cl.$^7$ ........................................................ B60N 2/42
(52) U.S. Cl. ................. 297/216.18; 297/216.19; 297/216.1
(58) Field of Search ................. 297/216.18, 216.19, 297/216.16, 216.1; 296/68.1

(56) References Cited

U.S. PATENT DOCUMENTS

| | | |
|---|---|---|
| 2,900,036 | 8/1959 | Blake . |
| 3,578,376 | * 5/1971 | Hasegawa et al. ......... 297/216.19 X |
| 3,992,046 | 11/1976 | Braess . |
| 4,738,485 | 4/1988 | Rumpf . |
| 5,167,421 | 12/1992 | Yunzhao . |
| 5,344,204 | 9/1994 | Liu . |
| 5,947,543 | * 9/1999 | Hubbard ...................... 297/216.19 X |
| 6,076,887 | * 6/2000 | Andersson ...................... 297/216.19 |
| 6,092,853 | * 7/2000 | Hubbard ........................... 297/216.19 |

* cited by examiner

*Primary Examiner*—Anthony D. Barfield
(74) *Attorney, Agent, or Firm*—Tarolli, Sundheim, Covell, Tummino & Szabo L.L.P.

(57) ABSTRACT

An apparatus (10) includes a seat (11) for a vehicle occupant (18), a support (20) for the seat (11), and an actuator mechanism (40). The seat (11) has a forward position in the vehicle (12) and a rearward position in the vehicle (12). The support (20) enables the seat (11) to move on the support (20) from the forward position to the rearward position in the vehicle (12) during a frontal vehicle collision (13). The actuator mechanism (40), when actuated, moves the seat (11) from the forward position to the rearward position in a first stage of movement and raises a front portion (14) of the seat (11) in a second stage of movement subsequent to the completion of the first stage.

14 Claims, 4 Drawing Sheets

THRUST AND ROCK VEHICLE SEAT

FIELD OF THE INVENTION

This invention relates to a vehicle occupant protection system and, more particularly, to a vehicle seat that moves to help protect a vehicle occupant during a frontal vehicle collision.

BACKGROUND OF THE INVENTION

A variety of systems have been devised for vehicle occupant protection. The most commonly employed systems have belts or harnesses to fasten about vehicle occupants, as well as inflatable air bags. These systems help to control occupant motion and absorb the occupant's kinetic energy during a vehicle collision.

Both upper and lower body protection can be achieved by purely "passive" systems. "Passive" refers to the fact that the occupant does not have any active participation in the actuation or application of the protection system. "Passive" systems include automatically applied seat belts and automatically actuated air bags and knee bolsters. One such passive protection system includes an air bag to help protect the upper torso and head of a vehicle occupant and a knee bolster to provide lower body restraint.

SUMMARY OF THE INVENTION

In accordance with the present invention, an apparatus includes a seat for a vehicle occupant, a support for the seat, and an actuator mechanism. The seat has a forward position in the vehicle and a rearward position in the vehicle. The support enables the seat to move on the support from the forward position to the rearward position in the vehicle during a frontal vehicle collision. The actuator mechanism, when actuated, moves the seat from the forward position to the rearward position in a first stage of movement and raises the front portion of the seat in a second stage of movement subsequent to the completion of the first stage.

BRIEF DESCRIPTION OF THE DRAWINGS

The foregoing and other features of the present invention will become apparent to one skilled in the art upon reading the following description with reference to the accompanying drawings, in which.

DESCRIPTION OF A PREFERRED EMBODIMENT

Figure 1:
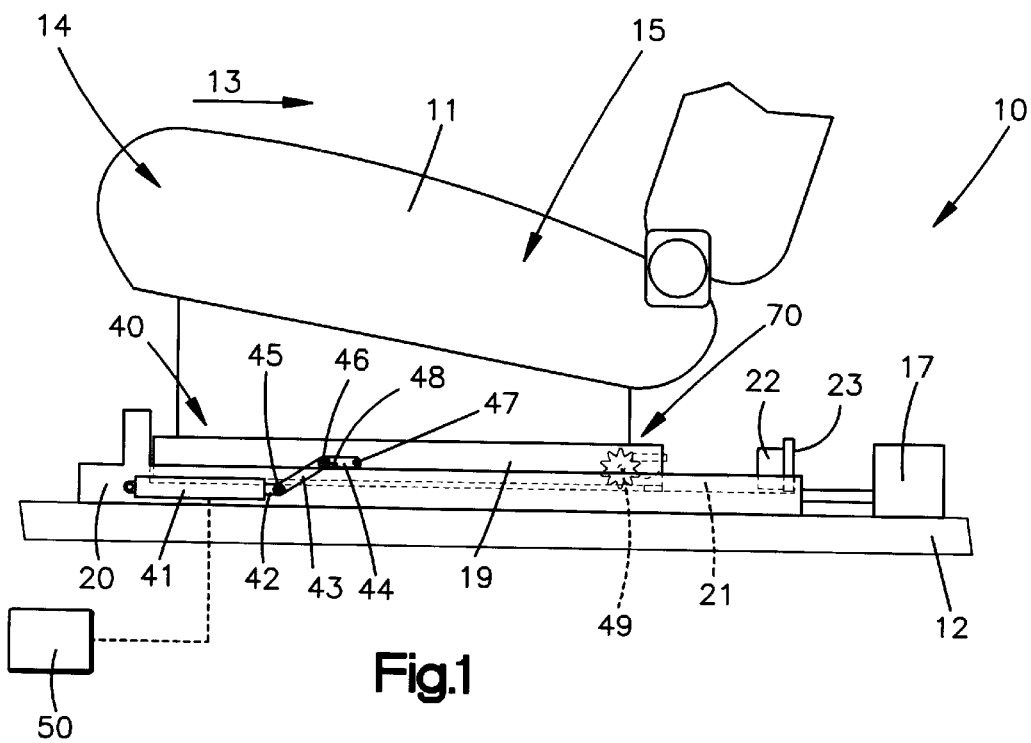
FIG. 1 is a schematic view of an apparatus embodying a first embodiment of the present invention and illustrating a seat in one position.
Figure 2:
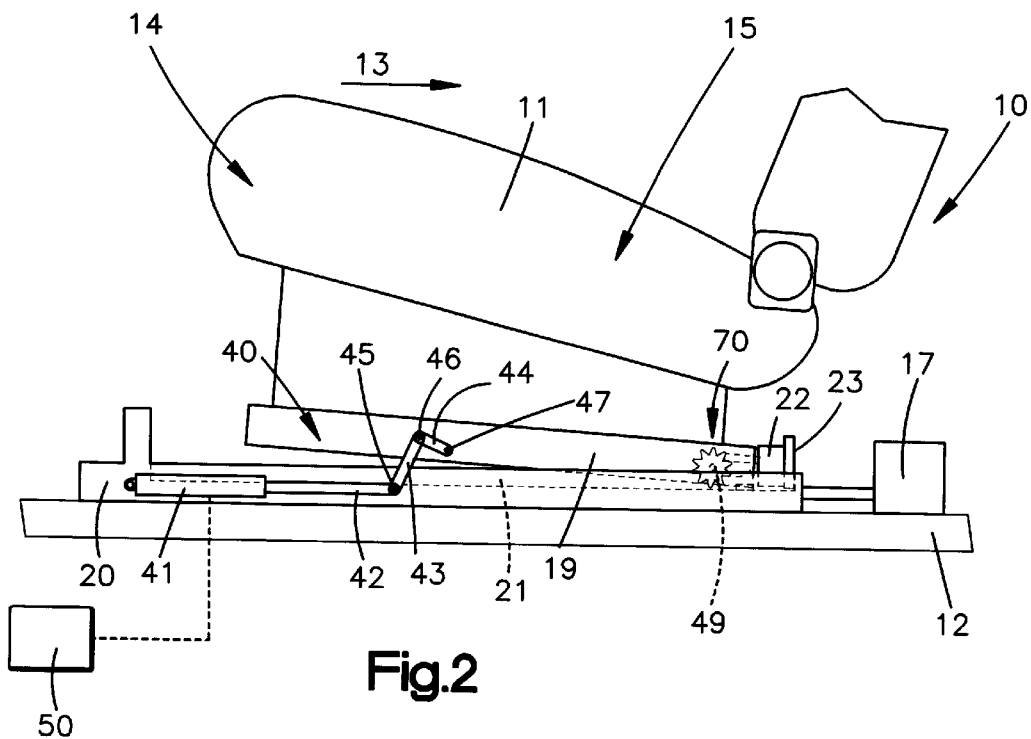
FIG. 2 is a schematic view of the apparatus of FIG. 1 illustrating the seat in a different position.
Figure 3:
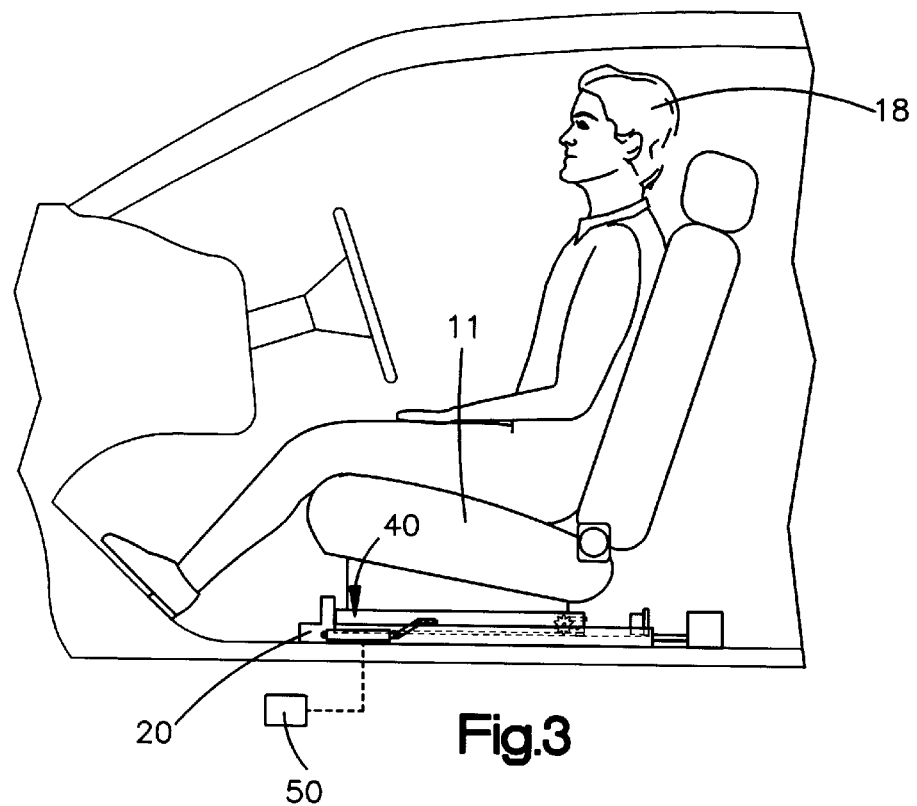
FIGS. 3 and 4 are schematic views of the vehicle seat of FIG. 1 during different operating conditions of a vehicle.
Figure 4:
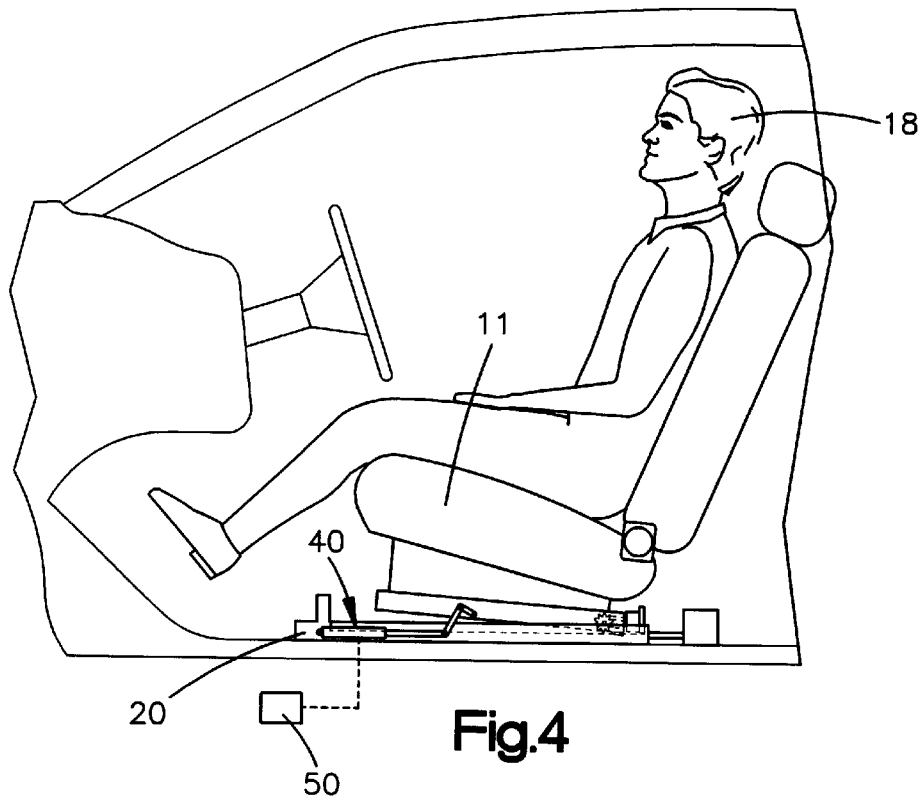

In accordance with a first embodiment of the present invention, as viewed in FIGS. 1 and 2, an apparatus 10 includes a seat 11 for the occupant 18 (FIG. 3) of a vehicle 12, a support 20 for the seat 11, a sensor 50, and an actuator mechanism 40. The seat 11 has rail members 19 (only one is shown). The rail members 19 slidingly engage the support 20 and slide relative to the support 20 in the direction of arrow 13 (FIG. 1).

The seat 11 has a forward position (FIG. 1) in the vehicle 12 and a rearward position (FIG. 2) in the vehicle 12. The seat 11 also has a front portion 14 located forwardly in the vehicle 12 and a rear portion 15 located rearwardly in the vehicle 12. The seat 11 and rail members 19 move from the forward position to the rearward position in the vehicle 12 during a frontal vehicle collision.

The support 20 is attached to the vehicle 12 and includes two guide tracks 21 (only one is shown), which engage the rails 19. The rails 19 slide from the forward position to the rearward position on the guide tracks 21.

The actuator mechanism 40, when actuated, moves the seat 11 from the forward position to the rearward position in a first stage of movement and raises the front portion 14 of the seat 11 in a second stage of movement subsequent to the completion of the first stage. The actuator mechanism 40 is typically actuated by the sensor 50 detecting a frontal impact to the vehicle of at least 25 miles per hour.

As viewed in FIGS. 1 and 2, the actuator mechanism 40 includes a cylinder 41 having a source of compressed gas (not shown). The cylinder 41 is non-rotationally and fixedly secured to the support 20. The cylinder 41, when the source of compressed gas is actuated, acts on a three link mechanism, first, to move the seat 11 rearwardly and, then, to raise the front portion 14 of the seat 11.

When the compressed gas source is actuated, compressed gas is directed into the cylinder 41. The compressed gas in the cylinder 41 forces linear movement of a rod 42 (first link) relative to the cylinder 44. The first link 42 is pivotally connected to a second link 43 at a first axis 45. The second link 43 is pivotally connected to a third link 44 at a second axis 46. The third link 44 is pivotally connected to the front portion 14 of the seat 11 at a third axis 47.

A lug 48 fixed on the third link 44 engages the second link 43 on one side of the second link 43 to block rotation of the second link 43 in a counterclockwise direction about the second axis 46. The lug 48 protrudes laterally from the third link 44 adjacent a side of the second link 43 near the second axis 46. The lug 48 blocks counterclockwise rotation (as viewed in FIGS. 1 and 2) of the second link 43 about the second axis 46 towards the third link 44.

During a frontal vehicle collision, the sensor 50 actuates the gas source, which directs gas into the cylinder 41. This causes linear movement of the rod (first link 42) in a rearward direction. The second and third links 43, 44 initially move in the same direction with the first link 42 and do not pivot relative to each other because of lug 48. The seat 11 moves from the forward position to the rearward position against a rearward stop 22.

When the seat 11 reaches the rearward position, the first link 42 is still being forced in a rearward direction by the gas in the compressed gas cylinder 41. Since seat 11 is blocked from further rearward movement by the rearward stop 22, the force on the first link 42 is applied against the lug 48 by the second link 43. This force shears the lug 48, which enables the links 43, 44 to rotate about the first 45, second 46, and third 47 axes.

Since the first link 42 is limited to only linear movement by the compressed gas cylinder 41, such movement of the first link 42 to the right (as viewed in FIGS. 1 and 2) forces the second link 43 to rotate in a counterclockwise direction about the axis 45 (as viewed in FIGS. 1 & 2). The movement of the first link 42 to the right transfers a component of upward force to the second link 43 due to the upward sloping orientation of the second link 43 from left to right (as viewed in FIGS. 1 & 2).

The counterclockwise rotation of the second link 43 forces the second axis 46 upward. The upward movement of the second axis 46 forces the third link 44 to rotate in a clockwise direction about the third axis 47 (as viewed in FIGS. 1 & 2). These movements ultimately force the third axis 47 to move upward. The upward movement of the third axis 47 lifts the front portion 14 of the seat 11. The rear portion 15 of the seat 11 pivots about a fourth axis 49 when the front portion 14 of the seat 11 moves upward (as viewed in FIG. 2).

A ratchet mechanism 70 at the fourth axis 49 secures the seat 11 in a tilted position (as shown in FIG. 2) and prevents the front portion 14 of the seat 11 from pivoting downward to its initial elevation. An internal stop (not shown) for the first link 42 within the compressed gas cylinder 41 and the ratchet mechanism 70 prevent the three links 42, 43, 44 from further movement and the front portion 14 of the seat 11 from being raised higher than a predetermined amount.

The rearward stop 22 determines the location of the rearward limit position of the rail members 19 on the support 20. A suitable means 23 for adjusting the location of the rearward stop 22 on the support 20 enables the length of travel of the seat 11 during a collision to be varied. The means 23 may be any suitable structure, such as a solenoid or a motor and drive (not shown).

The travel distance between the forward position and the rearward position of the seat 11 is typically about 25 millimeters and can be as much as 50 millimeters. The rearward stop 22 may be moved within this range for tailoring the movement of the seat during a collision to occupants of different heights, and for various crash criteria. The front portion 14 of the seat 11 is typically raised about 25 millimeters but can be raised more or less.

Moreover, the seat 11, rail members 19, and support 20 are adjustably connected to the vehicle 12. A means 17, such as a motor and drive, adjusts the location of the seat 11, rail members 19, and support 20 in the vehicle for occupants of different heights. The adjustment occurs by actuation of the means 17, which, when actuated, moves the seat 11, rail members 19, and support 20 forward or rearward in the vehicle.

The vehicle 12 may include, in addition to the apparatus 10, other vehicle occupant protection apparatuses, such as air bags and seat belts (not shown).

Figure 5:
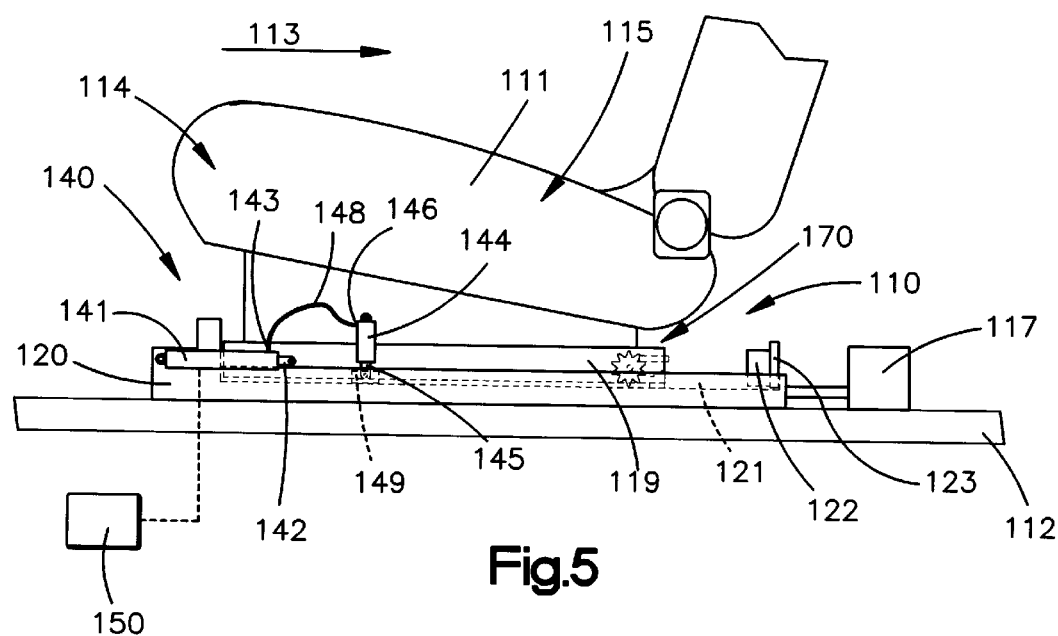
FIG. 5 is a schematic view of an apparatus embodying a second embodiment of the present invention and illustrating a seat in one position.
Figure 6:
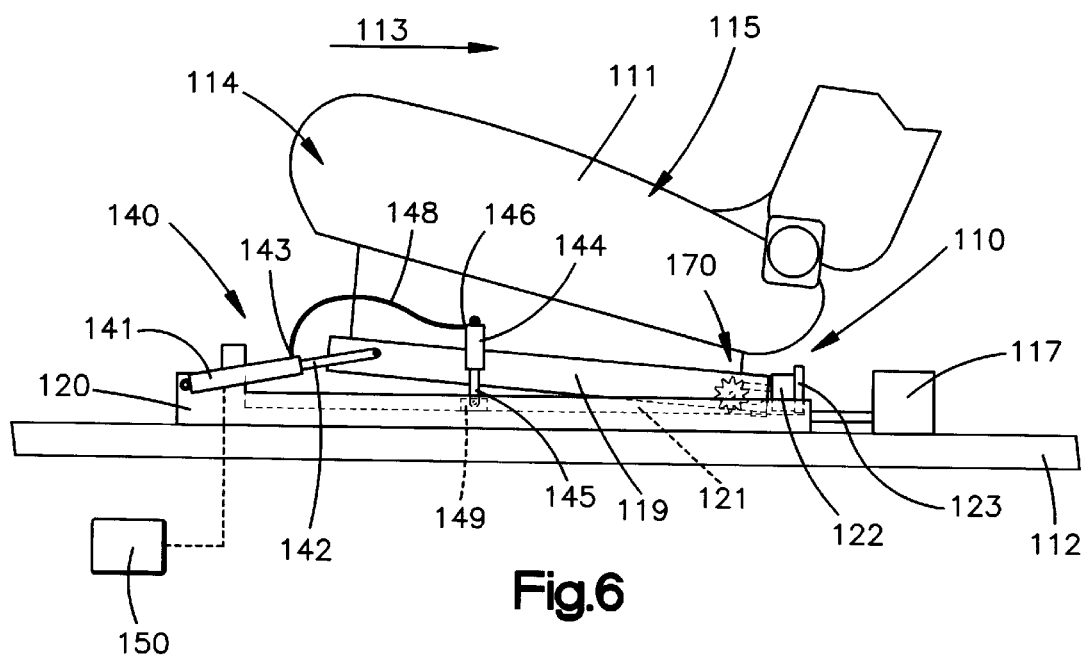
FIG. 6 is a schematic view of the apparatus of FIG. 5 illustrating the seat in a different position.
Figure 7:
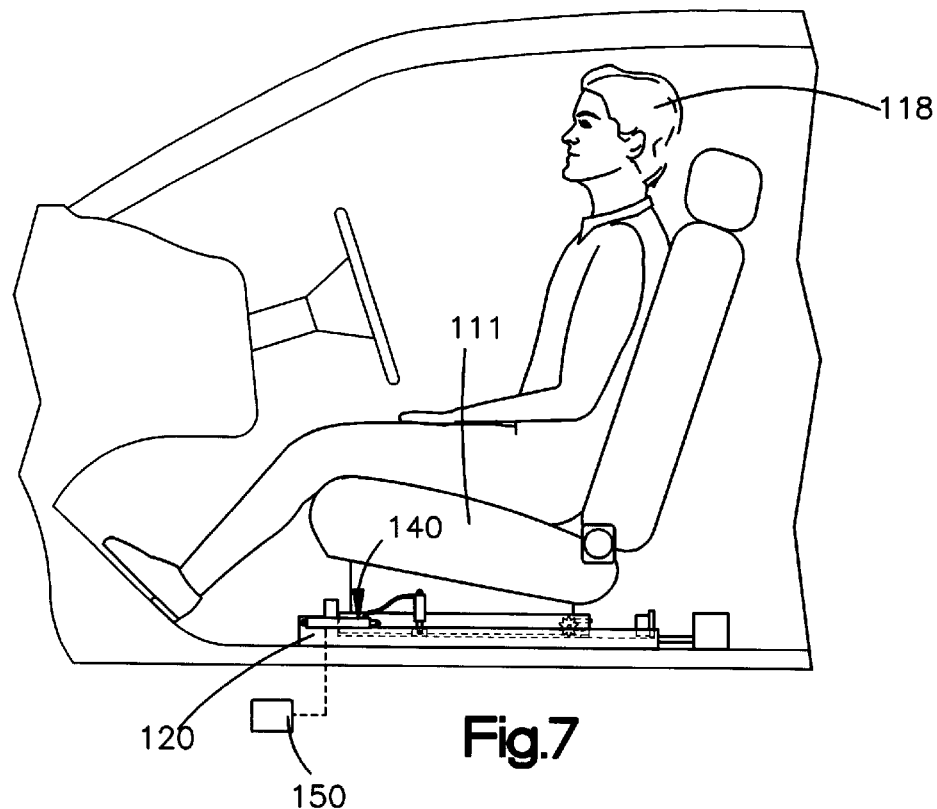
FIGS. 7 and 8 are schematic views of the vehicle seat of FIG. 5 during different operating conditions of a vehicle.
Figure 8:
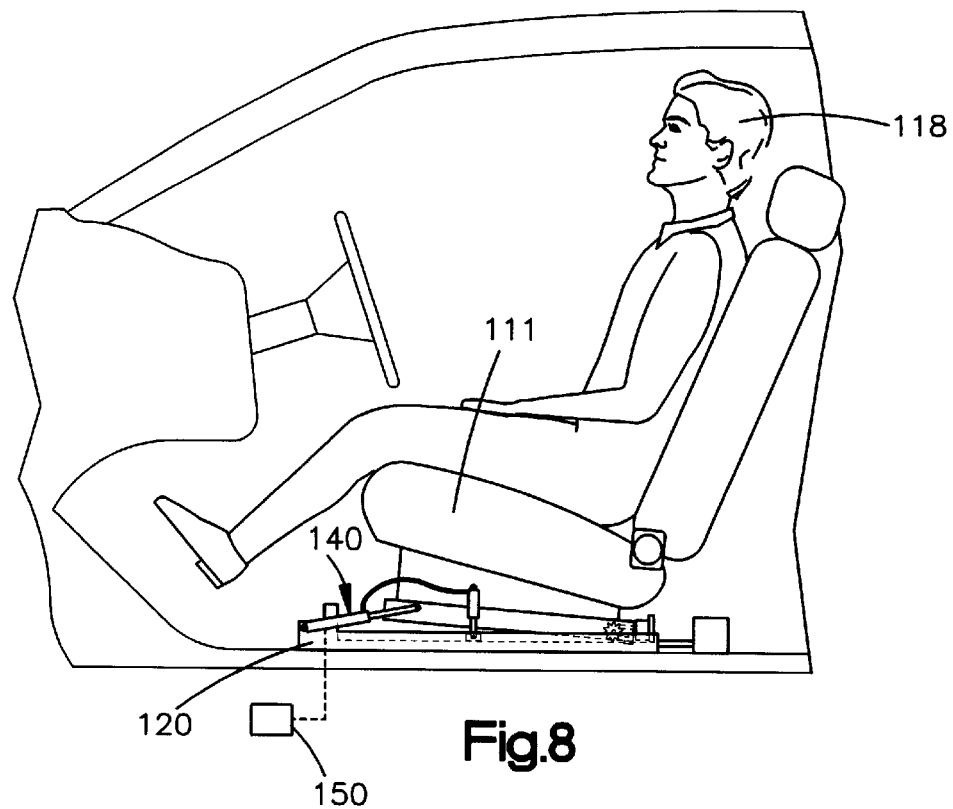

In accordance with a second embodiment of the present invention, as viewed in FIGS. 5 and 6, an apparatus 110 includes a seat 111 for an occupant 118 (FIG. 7) of a vehicle 112, a support 120 for the seat 111, a sensor 150, and an actuator mechanism 140. The seat 111 has rail members 119 (only one is shown). The rail members 119 slidingly engage the support 120 and slide relative to the support 120 in the direction of arrow 113 (FIG. 5).

The seat 111 has a forward position (FIG. 5) in the vehicle 112 and a rearward position (FIG. 6) in the vehicle 112. The seat 111 also has a front portion 114 located forwardly in the vehicle 112 and a rear portion 115 located rearwardly in the vehicle 112. The seat 111 and rail members 119 move from the forward position to the rearward position in the vehicle 112 during a frontal vehicle collision.

The support 120 is attached to the vehicle 112 and includes two guide tracks 121 (only one is shown), which engage the rails 119. The rails 119 slide from the forward position to the rearward position on the guide tracks 121.

The actuator mechanism 140, when actuated, moves the seat 111 from the forward position to the rearward position in a first stage of movement and raises the front portion 114 of the seat 111 in a second stage of movement subsequent to the completion of the first stage. The actuator mechanism 140 is actuated by the sensor 150 detecting a frontal impact to the vehicle of at least 25 miles per hour.

As viewed in FIGS. 5 and 6, the actuator mechanism 140 includes a first cylinder 141 having a source of compressed gas (not shown). The cylinder 141 is pivotally secured to the support 120 and acts on the seat 111 to move the seat 111 rearwardly. The actuator mechanism 140 further includes a second cylinder 144. The second cylinder 144 is non-rotationally and fixedly secured to the seat 111 and acts to raise the front portion 114 of the seat 111 subsequent to the first cylinder 141 moving the seat 111 rearwardly.

The first cylinder 141 includes a first rod 142, which is pivotally secured to the seat 111. The second compressed gas cylinder 144 includes a second rod 145 which is pivotally secured to a shoe 149. The shoe 149 slidably engages a guide track 121.

A flexible tube 148 connects the interior of the first gas cylinder 141 (at point 143) in fluid communication with the interior of the second gas cylinder 144 (at point 146). The tube 148 directs gas from the interior of first cylinder 141 to the interior of second cylinder 144.

During a frontal vehicle collision, the sensor 150 actuates the source of compressed gas for the first compressed gas cylinder 141, which causes rod 142 to move the seat 111 in a rearward direction in the first stage of movement. During this movement, shoe 149 slides on the guide track 121. The seat 111 moves from the forward position to the rearward position against a rearward stop 122.

When the seat 111 reaches the rearward position, the rod 142 in the first compressed gas cylinder 141 reaches connection point 143 at which tube 148 is exposed to gas in the first cylinder 141. At this time, gas is still being supplied to the first cylinder 141. Since the seat 111 is blocked from further rearward movement by the rearward stop 122, the gas from the first cylinder 141 flows through the tube 148 to the second cylinder 144 and enters the cylinder 144 at connection point 146. The gas actuates the gas cylinder 144 and pushes the second rod 142 out of the cylinder 144. The shoe 149 at the end of the second rod 142 is pressed down against one of the guide tracks 121. Because the tracks 121 are fixed, the second cylinder 144 is forced to move upward, which lifts the front portion 114 of the seat 111. The front portion 114 of the seat 111 is thus raised in the second stage of movement.

A ratchet mechanism 170 secures the seat 111 in a tilted position and prevents the front portion 114 of the seat 111 from pivoting downward to its initial elevation (as seen in FIG. 5).

The rearward stop 122 determines the location of the rearward limit position of the rail members 119 on the support 120. A suitable means 123 for adjusting the location of the rearward stop 122 on the support 120 enables the length of travel of the seat 111 during a collision to be varied. The means 123 may be any suitable structure, such as a solenoid or a motor and drive (not shown).

The travel distance between the forward position and the rearward position of the seat 111 is typically about 25 millimeters and can be as much as 50 millimeters. The rearward stop 122 may be moved within this range for tailoring the movement of the seat during a collision to occupants of different heights and various crash criteria. The front portion 114 of the seat 111 is typically raised about 25 millimeters, but can be raised more or less.

Moreover, the seat 111, rail members 119, and support 120 are adjustably connected to the vehicle 112. A means 117, such as a motor and drive, adjusts the location of the seat 111, rail members 119, and support 120 in the vehicle for occupants of different heights. The adjustment occurs by actuation of the means 117, which, when actuated, moves the seat 111, rail members 119, and support 120 forward or rearward in the vehicle.

The vehicle 112 may include, in addition to the apparatus 110, other vehicle occupant protection apparatuses, such as air bags and seat belts (not shown).

From the above description of the invention, those skilled in the art will perceive improvements, changes and modifications. Such improvements, changes and modifications within the skill of the art are intended to be covered by the appended claims.

Having described the invention, the following is claimed:

1. An apparatus comprising:
   a seat for a vehicle occupant, said seat having a forward position in the vehicle and a rearward position in the vehicle;
   a support for said seat enabling said seat to move on said support from said forward position to said rearward position during a frontal vehicle collision; and
   an actuator mechanism for, when actuated, moving said seat from said forward position to said rearward position in a first stage of movement and raising a front portion of said seat in a second stage of movement subsequent to the completion of said first stage of movement.

2. The apparatus as defined in claim 1 further including a sensor for detecting said frontal vehicle collision and actuating said actuator mechanism in response to detecting said collision.

3. The apparatus as defined in claim 1 further including a rearward stop against which said seat moves and which determines said rearward position.

4. The apparatus as defined in claim 1 wherein said seat includes at least one rail member which slides on said support from said forward position to said rearward position.

5. The apparatus as defined in claim 1 wherein the travel distance between said forward position and said rearward position on said support is about 25 millimeters.

6. The apparatus as defined in claim 1 wherein said actuator mechanism is connected to said support.

7. The apparatus as defined in claim 1 further including a mechanism, separate and apart from said actuator mechanism, for adjusting the position of said support forwardly and rearwardly in the vehicle for occupants of different heights.

8. The apparatus as defined in claim 1 wherein said actuator mechanism raises said front portion of said seat about 25 millimeters.

9. The apparatus as defined in claim 1 wherein said rear portion of said seat is pivotally mounted to said support.

10. An apparatus comprising:
    a seat for a vehicle occupant, said seat having a front portion located forwardly in a vehicle and a rear portion located rearwardly in the vehicle, said seat having a forward position in the vehicle and a rearward position in the vehicle;
    a support for said seat enabling said seat to move relative to said support from said forward position to said rearward position during a frontal vehicle collision; and
    an actuator mechanism for moving said seat from said forward position to said rearward position in a first stage of movement and raising said front portion of said seat in a second stage of movement subsequent to the completion of said first stage of movement.

11. The apparatus as defined in claim 10 wherein said actuator mechanism has a pivotal connection with said front portion of said seat enabling relative pivotal movement between said front portion of said seat and said actuator mechanism.

12. The apparatus as defined in claim 10 wherein said actuator mechanism includes a first gas cylinder for moving said seat from said forward position to said rearward position.

13. The apparatus as defined in claim 12 wherein said actuator mechanism further includes a second gas cylinder for raising said front portion of said seat.

14. An apparatus comprising:
    a seat for a vehicle occupant, said seat having a front portion located forwardly in a vehicle and a rear portion located rearwardly in the vehicle, said seat having a forward position in the vehicle and a rearward position in the vehicle;
    a support for said seat enabling said seat to move relative to said support from said forward position to said rearward position during a frontal vehicle collision; and
    an actuator mechanism for moving said seat from said forward position to said rearward position in a first stage of movement and raising said front portion of said seat in a second stage of movement subsequent to the completion of said first stage of movement,
    said actuator mechanism including a first gas cylinder for moving said seat from said forward position to said rearward position, a second gas cylinder for raising said front portion of said seat, and a flexible tube for interconnecting said first gas cylinder and said second gas cylinder to direct gas from said first cylinder to said second cylinder.

* * * * *